United States Patent [19]
Yoshimoto

[11] Patent Number: 4,779,275
[45] Date of Patent: Oct. 18, 1988

[54] SYNCHRONIZATION CIRCUIT FOR DIGITAL COMMUNICATION SYSTEMS

[75] Inventor: Makoto Yoshimoto, Tokyo, Japan
[73] Assignee: NEC Corporation, Tokyo, Japan
[21] Appl. No.: 846,451
[22] Filed: Mar. 31, 1986
[30] Foreign Application Priority Data
Mar. 30, 1985 [JP] Japan ................................. 60-64979
Mar. 30, 1985 [JP] Japan ................................. 60-64981
[51] Int. Cl.[4] .......................... G06F 11/10; H04L 7/06
[52] U.S. Cl. .......................................... 371/42; 371/47
[58] Field of Search ............................ 371/42, 47, 46; 370/111

[56] References Cited

U.S. PATENT DOCUMENTS

| | | | |
|---|---|---|---|
| 3,466,601 | 9/1969 | Tong | 371/42 |
| 3,550,082 | 12/1970 | Tong | 371/42 |
| 3,571,794 | 3/1971 | Tong | 371/42 |
| 3,753,228 | 8/1973 | Nickolas et al. | 371/47 |
| 3,781,818 | 12/1973 | Pardoe et al. | 370/111 X |
| 4,208,650 | 6/1980 | Horn | 371/47 |
| 4,312,070 | 1/1982 | Coombes et al. | 371/42 X |
| 4,387,460 | 6/1983 | Boutmy et al. | 370/111 X |
| 4,468,752 | 8/1984 | Chatham | 371/47 X |
| 4,481,648 | 11/1984 | Fujii | 371/42 X |
| 4,525,840 | 6/1985 | Heinz et al. | 371/47 |

*Primary Examiner*—Charles E. Atkinson
*Attorney, Agent, or Firm*—Sughrue, Mion, Zinn, Macpeak, and Seas

[57] ABSTRACT

In a digital communication system, a sync word is generated at intervals at the transmitting end and appended to a data bit stream having redundant bits generated by an error correction encoder. The sync word indicates the position of the redundant bits in the data bit stream. At a receiving end of the system, a syndrome generator is responsive to the data bit stream for deriving therefrom a syndrome and applying it to the error corrector to cause it to correct error which may exist in the data bit stream. A word synchronizer detects the sync word contained in one of the syndromes and causes the syndrome generator to establish synchronism with the data bit stream. The word synchronizer includes a detector for detecting a prescribed set of binary states in the syndromes which indicate that there is no errors in the data bit stream and causing the syndrome generator to generate a syndrome synchronously with data words in the data bit stream.

5 Claims, 12 Drawing Sheets

BUS 76

BUS 83
(NO ERRORS PRESENT)

BUS 83
(ERROR PRESENT)

SYNCHRONIZATION CIRCUIT FOR DIGITAL COMMUNICATION SYSTEMS

BACKGROUND OF THE INVENTION

The present invention relates to a digital communication system having an error correction circuit.

Figure 9:
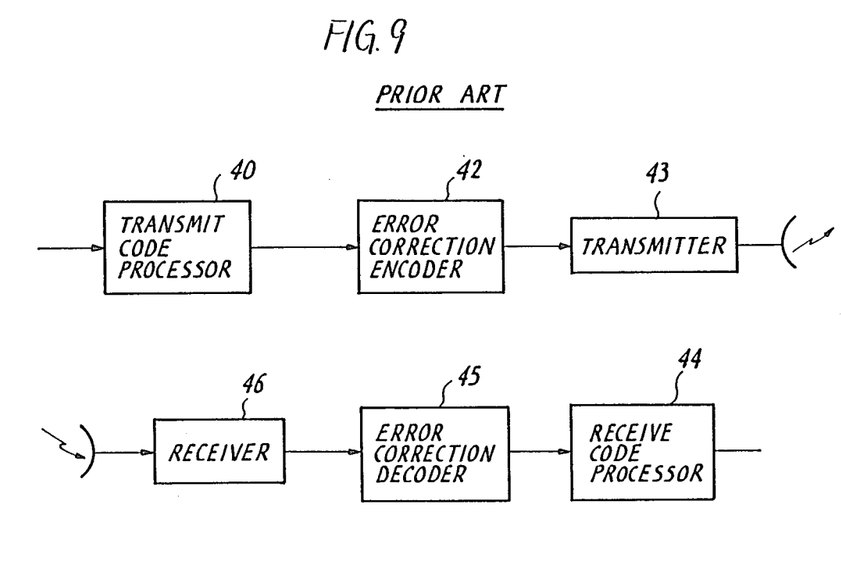
FIGS. 9-11 are illustrations of a prior art digital radio communication system.

In a prior art digital radio communication system as shown in FIG. 9, an input signal is processed by a transmit code processor 40 at the transmitting end of the system to produce a data bit stream which is fed to an error correction encoder 42 where error correcting codes are added and modulated by a transmitter 43 and sent over a radio link to a receiving end of the link. At the receiving end of the link, the signal is demodulated by a receiver 46 and fed to an error correction decoder 45 to correct data bits in error and applied to a receive code processor 44 to treat it in a process inverse to that of transmit code processor 40. Details of the transmit code processor 40, error correction encoder 42, error correction decoder 45 and receiver code processor 44 are shown in FIGS. 10 and 11.

Figure 10:
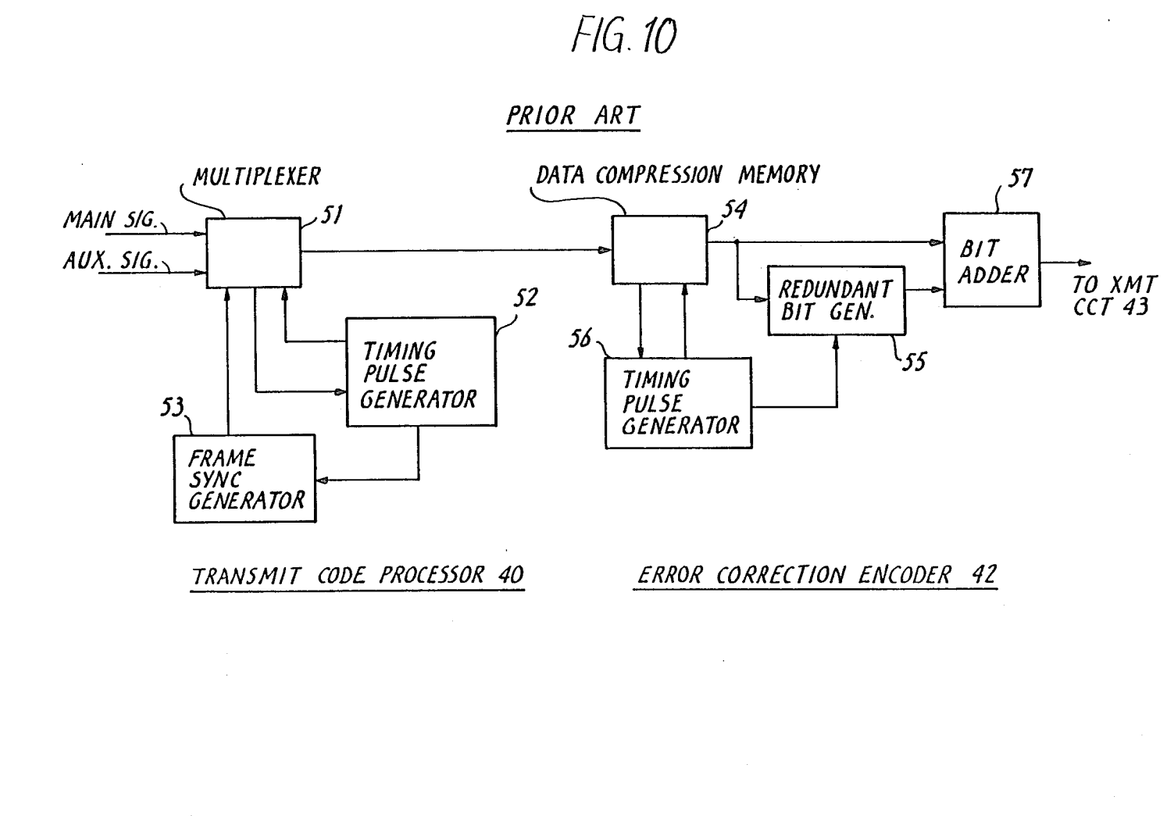

In FIG. 10, transmit code processor 40 includes a multiplexer 51 to which a main signal and an auxiliary signal are applied. A timing signal generator 52 generates a timing output pulse which causes a frame sync generator 53 to supply a frame sync code to the multiplexer 51. Input data signals are multiplexed with the frame sync code into an output data stream in response to a timing signal from generator 52 and fed to a data compression memory 54 of the error correction encoder 42. Error correction encoder 42 is provided with a timing signal generator 56 whose output determines the rate of compression of the time dimension of data. Compression memory 54 compresses the time dimension of its input signal into groups of clustered data bits to provide time slots for insertion of redundant bits. The time-compressed data bits are fed to a redundant bit generator 55 to allow it detect timing for bit insertion and generate error correction redundant bits which are inserted to the time-compressed data stream by a bit adder 57 and sent to the receiver 46 at the receiving end.

Figure 11:
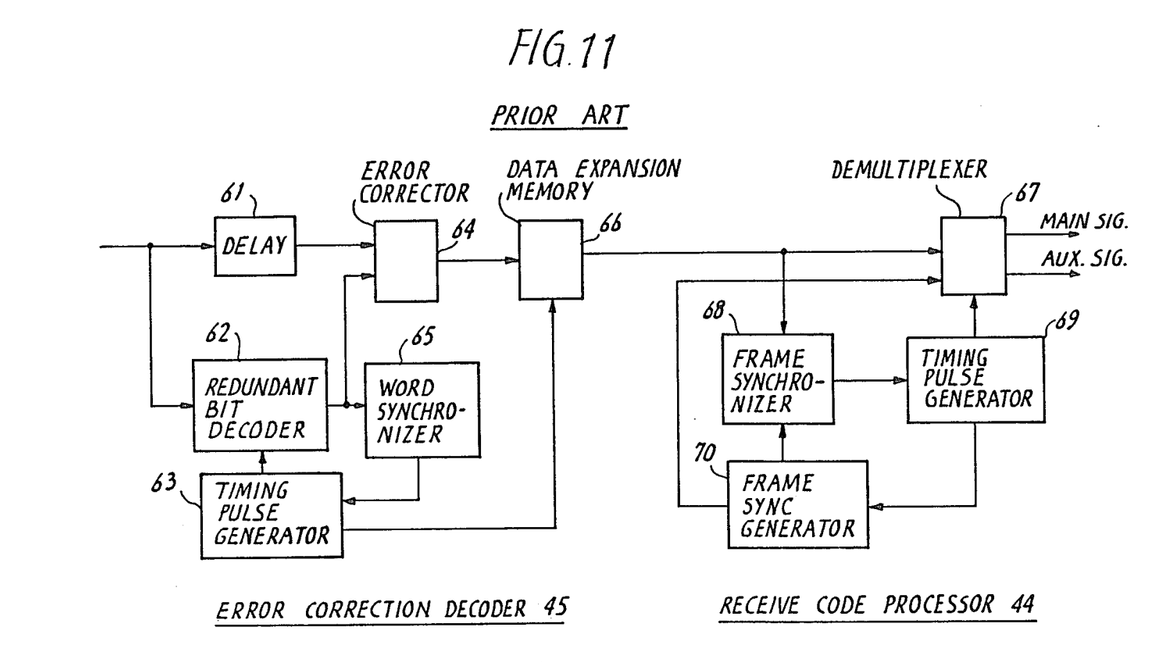

In FIG. 11, error correction decoder 45 includes a delay circuit 61 and a redundant bit decoder 62 to both of which the output of receiver 46 is applied. Decoder 62 supplies a syndrome to an error corrector 64 and a word synchronizer 65. Word synchronizer 65 supplied a hunting pulse to a timing signal generator 63 to cause it to be word synchronized. The input signal applied to delay circuit 61 is delayed until redundant bit decoding operation is complete and fed to error corrector 64. Data bits in error are corrected using the syndrome supplied from decoder 62 and fed to a data expansion memory circuit 66 where the time dimension of the data is recovered, while removing the inserted redundant bits.

The output of expansion memory circuit 66 is applied to a frame synchronizer 68 which detects the frame sync code by checking it against a frame sync code generated by a frame sync generator 70 and supplied a hunting pulse to a timing signal generator 69 to cause it to generate a timing signal to frame sync generator 70 at frame-synchronized timing. Input data from memory circuit 66 is demultiplexed into separate signals by a timing signal received from generator 69.

With the aforesaid prior art frame synchronization circuit, word synchronization is established prior to the establishment of frame synchronization. As a result, it takes longer to establish frame synchronization and requires duplication of similar sync detecting circuits.

SUMMARY OF THE INVENTION

It is thererfore an object of the present invention to provide a digital communication system having an error correction encoder at the transmitting end of the system and an error correction decoder having an error corrector at the receiving end of the system, the system eliminating the need for inserting frame synchronization codes which would otherwise occupy time slots for data bits and provides transmission efficiency by modulo-summing error correcting sync bits with error correcting redundant bits derived from a data bit stream.

According to the invention, error correcting sync bits are generated and redundant bits are derived from a data bit stream, the error correcting sync bits and redundant bitgs being modulo-summed to produce a composite data bit stream. The composite data bit stream is sent from a transmitting station and received at a receiving station where it is fed to a syndrome generator to derive syndromes. A word synchronizer is connected to the syndrome generator to detect the error correcting sync bits contained in one of the syndromes to cause the syndrome generator to establish word synchronism with the received data bit stream. An error corrector is responsive to the received bit stream to correct errors in accordance with the syndromes.

Preferably, the word synchronizer includes a detector for detecting a prescribed set of binary states in the syndromes which indicate that there is no error in the data bit stream and causing the syndrome generator means to generate a syndrome synchronously with data words in the data bit stream.

BRIEF DESCRIPTION OF THE DRAWINGS

The present invention will be described in further detail with reference to the accompanying drawings, in which.

DETAILED DESCRIPTION

Figure 1:
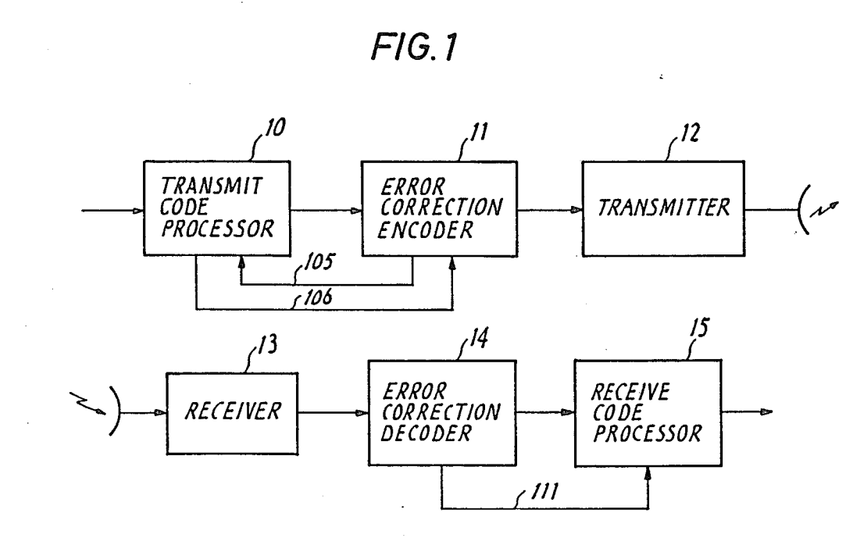
FIG. 1 is a block diagram of a digital radio communication system embodying the present invention.

FIG. 1 is a block diagram of a digital radio communication system embodying the present invention. As in the prior art system, the system of the invention comprises, at the transmitting end of a radio transmission link, transmit code processor 10, error correcting encoder 11 and transmitter 12, and at the receiving end, it comprises receiver 15, error correction decoder 14 and receive code processor 13. The system of the invention differs from the prior art in that transmit code processor 10 sends a bit-sync timing signal on a but 106 to error correction encoder 11 which sends back a frame-sync timing signal on bus 105, and in that error correction decoder 14 sends a timing pulse on a bus 111 to receive code processor 15. Details of the transmit code processor 10, error encoder 11, error decoder 14 and receive code processor 13 are shown in FIGS. 2 and 3.

Figure 2:
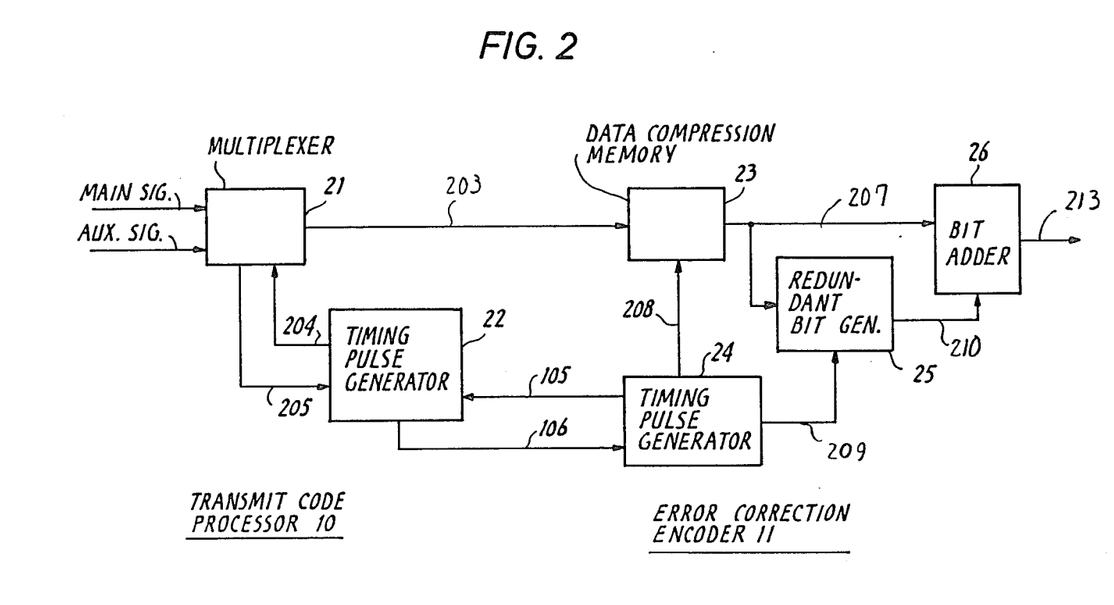
FIG. 2 is a block diagram of the transmit code processor and error correction encoder of the system of FIG. 1.
Figure 3:
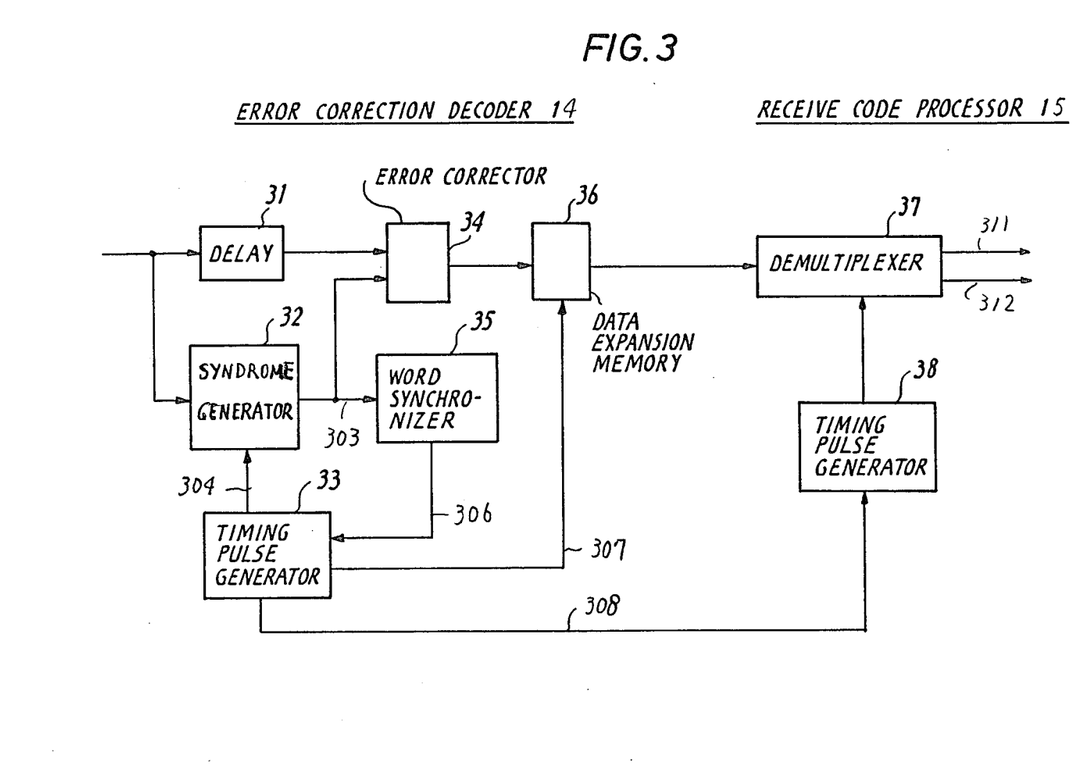
FIG. 3 is a block diagram of the error correction decoder and receive code processor of FIG. 1.

In FIG. 2 an input main digital signal which is received on a high frequency, main channel and an input auxiliary digital signal which is received on a low frequency, service channel, are applied to a multiplexer 21 where they are multiplexed together in response to a timing pulse supplied on bus 204 from a timing pulse generator 22 so that each data bit of the auxiliary signal is multiplexed in synchronism with a frame synchronization timing signal which is supplied on bus 105 from a timing pulse generator 24 of the error correction encoder 11. To accomplish this, timing pulse generator 22 initially established bit-synchronous operation in response to a proper timing pulse supplied on bus 205 from the multiplexer 21 and applies a bit-synchronization timing pulse on bus 106 to a timing pulse generator 24 which sends a framesynchronization timing pulse on bus 105 back to the timing pulse generator 22.

The multiplexed data bit stream is supplied from multiplexer 21 on bus 203 to a data compression memory circuit 23 of error correction encoder 11 to compress the time dimension of the multiplexed signal to allow redundant bits to be inserted thereto.

Figure 4:
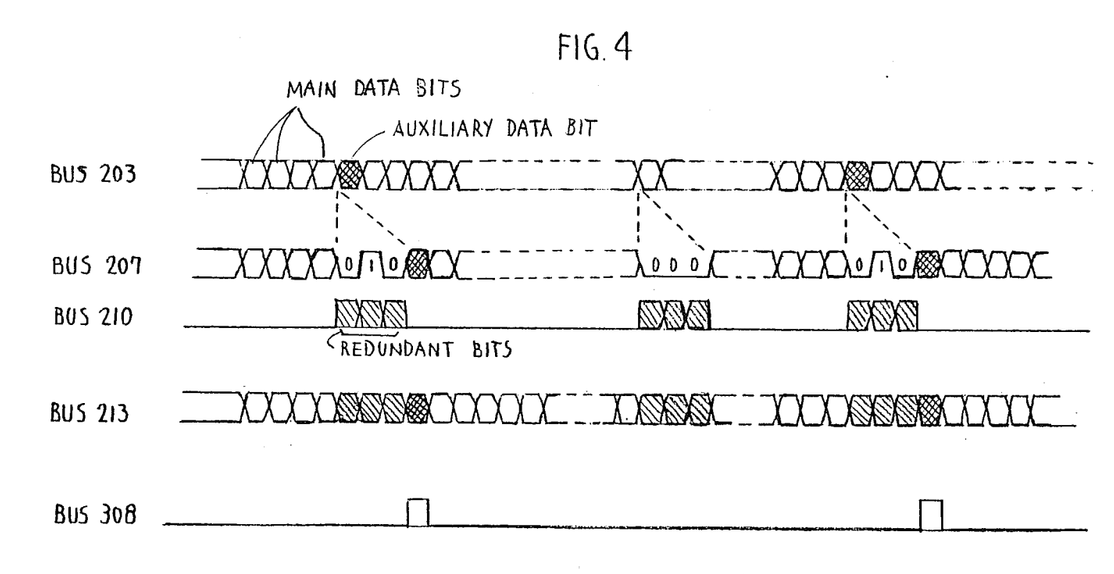
FIG. 4 is a timing diagram associated with the operation of circuits of FIGS. 2 and 3.

The timing pulse generator 24 generates a signal representing the position of time slots into which redundant bits are to be inserted and supplies it on buses 208 and 209 to compression memory circuit 23 and to a redundant bit generator 25 respectively, and further generates a sync word "010" concurrently with the generation of the frame synchronization timing signal on bus 105 and supplied it on bus 208 to the memory circuit 23. Therefore, the sync lists "010" are time-coincident with the time slots of the redundant bits which immediately precede each data bit of the auxiliary-channel signal. Redundant bit generator 25 derives error correcting redundant bits from the output of memory circuit 23 in response to the position indicating signal on bus 209, supplies the redundant bits on bus 210 to a bit adder 26 where they are modulo-summed with the error-correcting sync bits to produce a composite data bit stream (FIG. 4) which is applied through output bus 213 to transmitter 12 and transmitted to the receiving station.

In FIG. 3, the transmitted signal is received by receiver 13 and fed to a delay circuit 31 of error correction decoder 14 and to a redundant bit decoder, or syndrome generator 32. Syndrome generator 32 derives a syndrome from the input data and supplies it on bus 303 to a word synchronizer 35. Word synchronizer 35 monitors the syndromes, detects the modulo-summed error correcting sync bits from the monitored syndromes, and causes syndrome generator 32 to word-synchronize with input data words. For this purpose, word synchronizer 35 asynchronously generates a hunting pulse in response to the detection of the error correcting sync bits and supplies it on bus 306 to timing pulse generator 33 to cause it to generate a signal indicating the position of time slots in which the redundant bits have been inserted and supplies the position indicating signal on line 304 to syndrome generator 32 and on line 307 to a data expansion memory circuit 36. Using the position indicating signal, syndrome generator 32 performs the decoding of the redundant bits to generate syndromes. The input data stream is delayed by delay circuit 31 so that its output is time-coincident with the syndrome supplied from syndrome generator 32 to perform detection and correction of data bits in errors. The error-corrected data is applied to data expansion memory circuit 36 which removes the redundant bits from the data bit stream using the position indicating signal supplied on line 307 and expands the time dimension of the bit stream. The output of the data expansion memory circuit 36 is applied to the receive code processor 13.

Since the input data contains an error correction sync word "010" at frame intervals, word synchronizer 35 identifies a syndrome containing a work "010" and signals the timing pulse generator 33 on bus 306 to generate a timing pulse immediately preceding each of the auxiliary channel data bits. This timing pulse is applied on line 308 to a timing pulse generator 38 of receive code processor 15 which passes it at proper timing to a demultiplexer 37. Demultiplexer 37 separates the input data bit stream into the original main and auxiliary channel data streams on buses 311 and 312 in response to the output of timing pulse generator 38.

Figure 5:
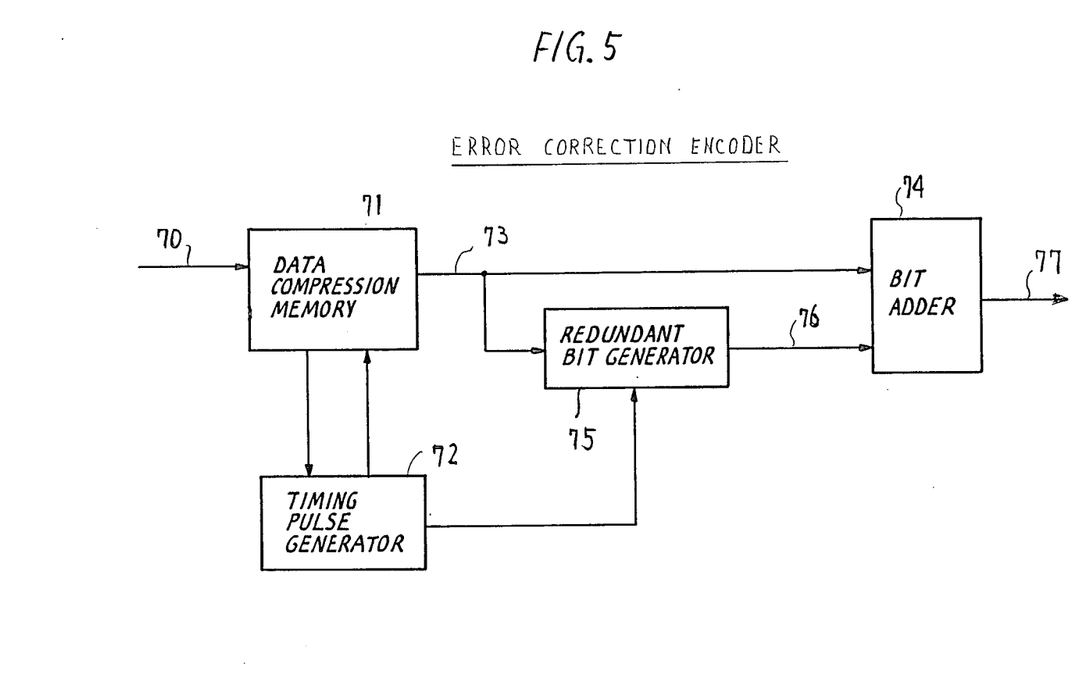
FIG. 5 is a block diagram of an error correction encoder of a second embodiment of the invention.
Figure 7A:
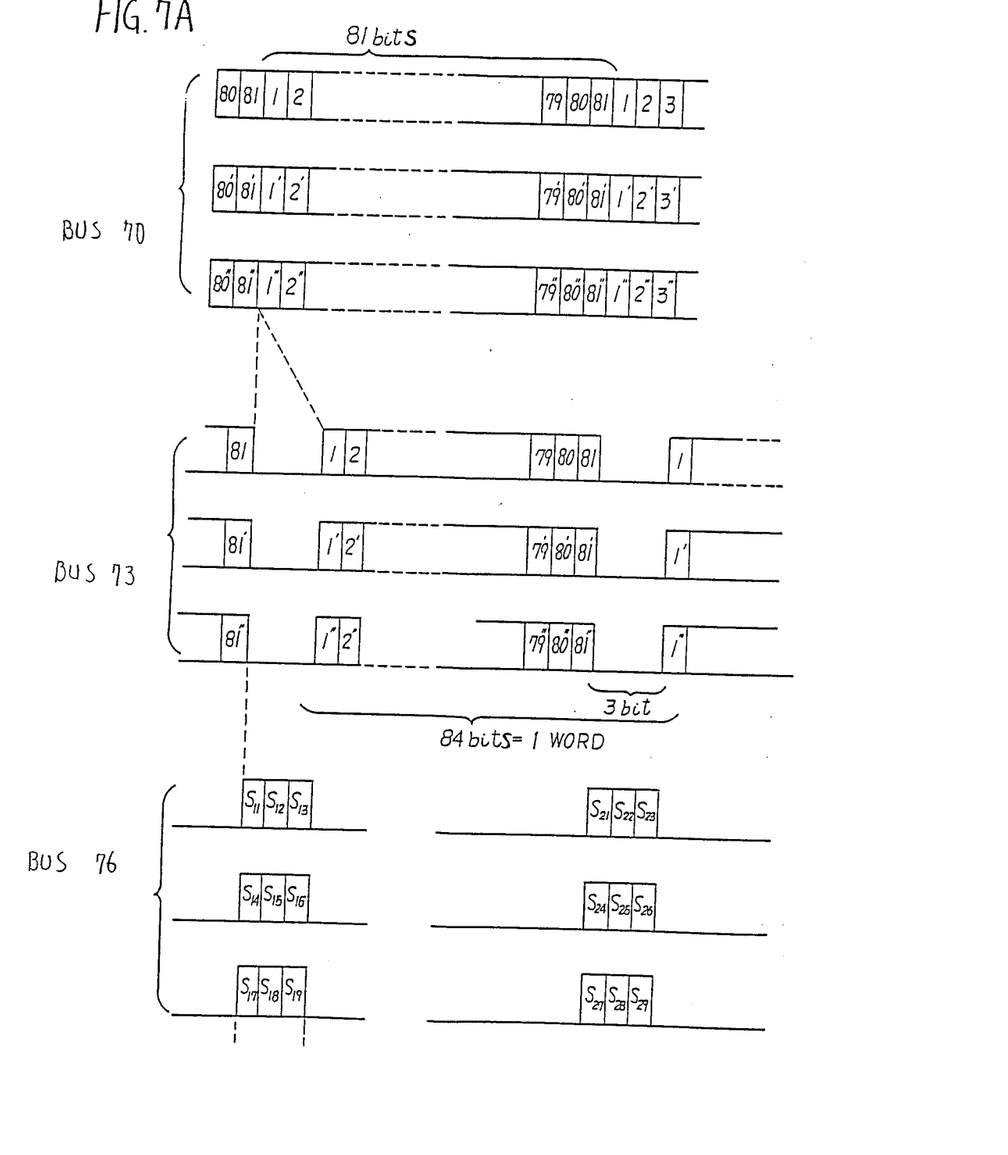
FIGS. 7A and 7B are illustrations of data formats associated with FIGS. 5 and 6.

FIG. 5 is a block diagram of an error correction encoder at the transmitting end of the system according to a second embodiment of the present invention in which word synchronization is utilized to eliminate the need for inserting frame sync codes. In FIG. 5, an input digital signal applied on input bus 70 to a data compression memory circuit 71 comprises three parallel data bit streams each including a series of 81-bit data words of the main channel as shown in FIG. 7A. For purposes of illustration, description on the auxiliary channel signal is omitted. The time dimension of the data bit streams is compressed to allow additional three binary "0" bits to be inserted to each data bit stream as error correcting sync bits in response to a timing pulse supplied from timing pulse generator 72 to form a series of 84-bit words on each data bit stream on output bus 73 as shown in FIG. 7A. The output signal from data compression memory circuit 71 is fed to a redundant bit adder 74 and to a redundant bit generator 75. Redundant bit generator 75 arithmetically divides (81 x 3) data bits and supplies (3×3) bits of residue on output bus 76 to bit adder 74 (see FIG. 7A). Redundant bit adder 74 provides modulo-summation of the (3×3)-bit residue with the all-zero three bits of the 84-bit data bit streams from compression memory 71, producing three 84-bit data streams on output bus 77 for application to the transmitter 12 (see FIG. 7B).

Figure 6:
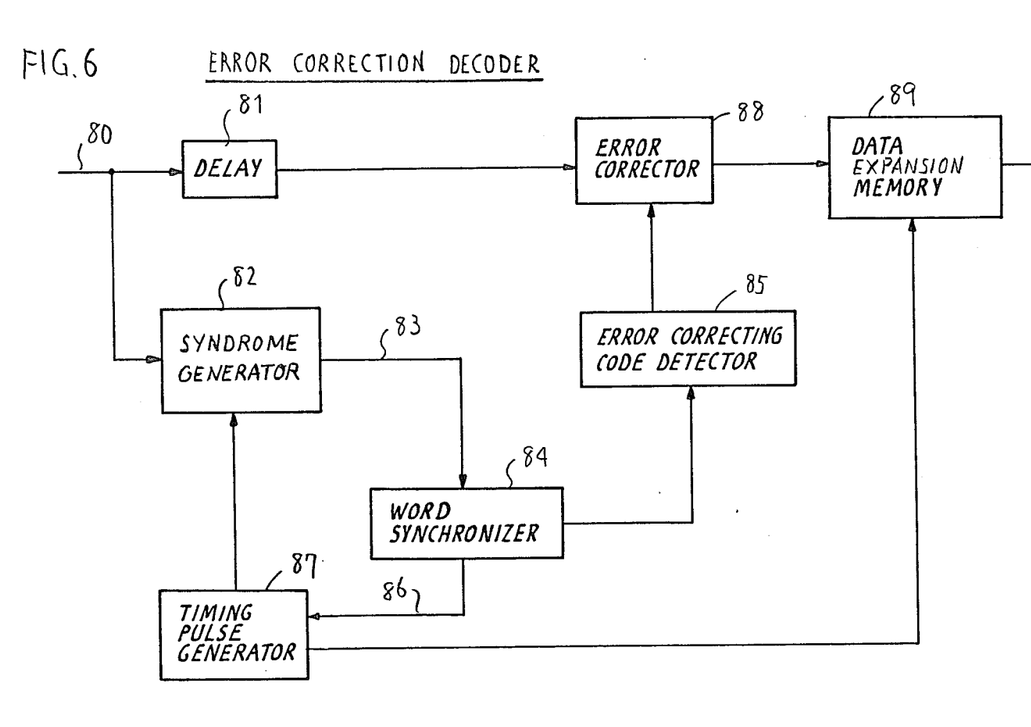
FIG. 6 is a block diagram of an error correction decoder of the second embodiments.
Figure 7B:
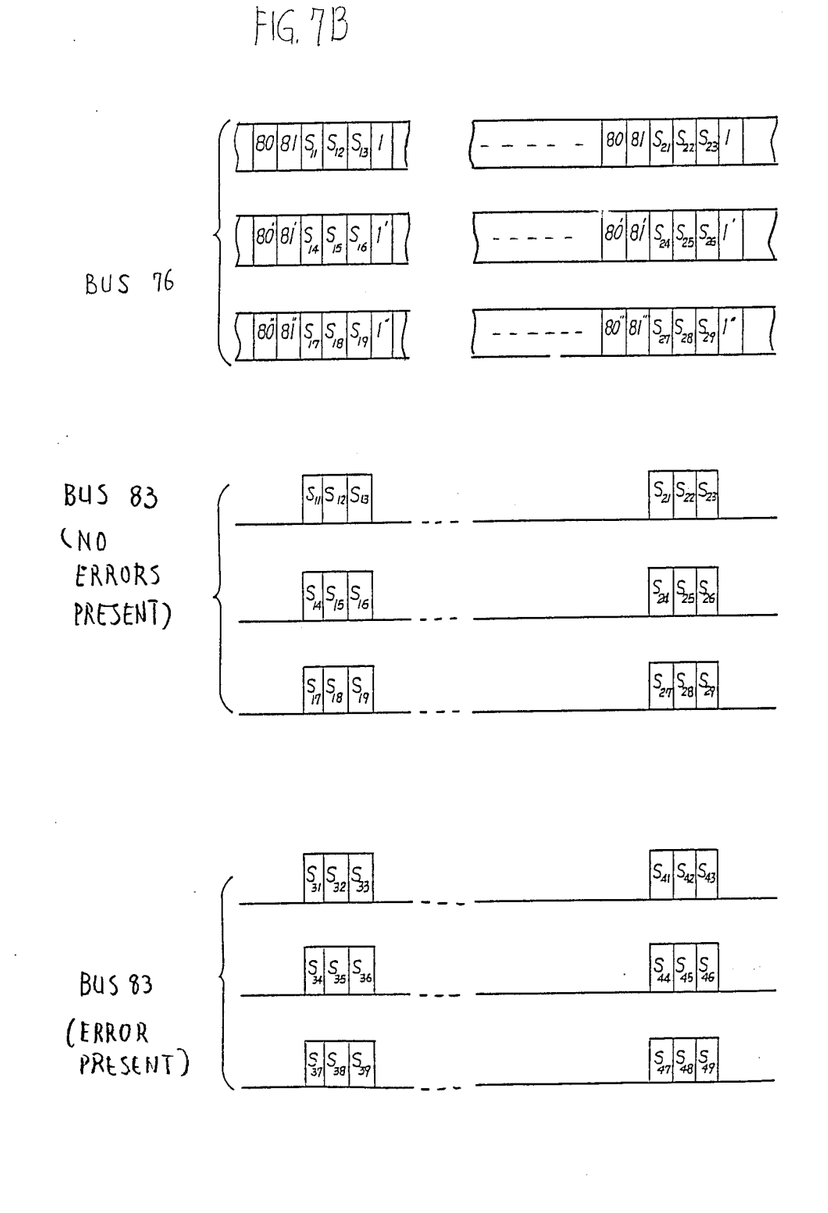

FIG. 6 is a block diagram of the error correction decoder circuit at the receiving end of the transmission system associated with the error correction encoder of FIG. 5. In FIG. 6, three data bits streams on input bus 80 are applied to delay circuit 81 and to a redundant bit decoder, or syndrome generator 82. Syndrome generator 82 divides the three input data bit streams of 81 bits each and derives three data bit streams of 3 bits each as a residue of the division on output bus 83. In the absence of error bits in the received data bit streams, the same residue as the residue generated by redundant bit generator 75, FIG. 5, is obtained on the output bus 83 of syndrome generator 82 (see FIG. 7B) and all-zero bits are delivered from syndrome generator 82. If error occurs during transmission, the output syndrome on bus 83 differs from the residue at the transmitting end (FIG. 7B).

Figure 8:
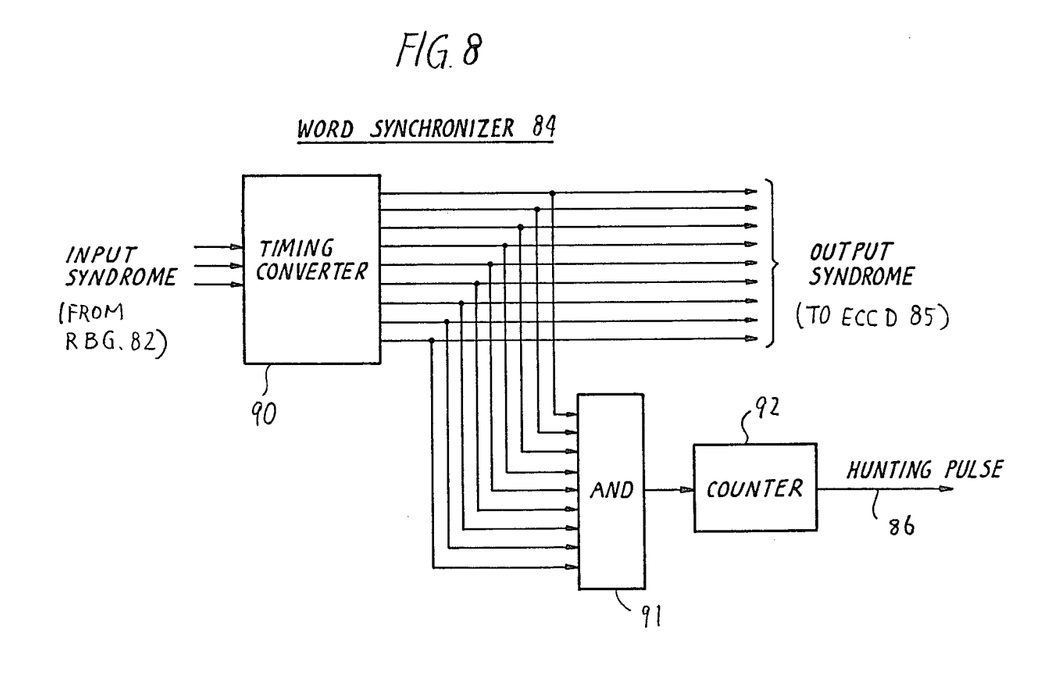
FIG. 8 is an illustration of details of the word synchronizer of FIG. 6.

The output of syndrome generator 82 is applied to a word synchronizer 84. As shown in FIG. 8, the word synchronizer 84 comprises a timing converter, or serial-to-parallel converter 90 which converts the timing of input syndrome from syndrome generator 82 so that the three bits of each syndrome bit sequence are time-coincident with each other and nine (9) parallel syndrome bits are applied simultaneously to an AND gate 91 and to an error correcting code detector 85. In the absence of error bits, all zero bits are fed to correcting code detector 85. The output of AND gate 91 is applied to a counter 92 having a hysteresis to detect an error bit in the received data bit streams by counting the occurrences of logical "1" at the output of AND gate 91. Once a full count is reached in the hysteresis counter, the full count is maintained for a prescribed period to prevent undesirable fluctuations. Likewise, when a zero count is reached, it is maintained for a prescribed period.

The output of counter 92 is applied as a hunting pulse on line 86 to a timing pulse generator 87, FIG. 6. This hunting pulse is repeatedly generated until all zero bits are presented to the inputs of AND gate 91, whereupon word synchronization is established. An error bit is detected from the nine-parallel input bits by detector 85 which derives therefrom an error correcting code indicating the time slot of the data bit stream in which the error has occurred and applies it to an error corrector 88. The input data bit stream, which has been delayed by the delay circuit 81, is applied to error corrector 88 and error bits which might exist therein are corrected by the output of error correcting code detector 85. The error-corrected data bit streams are applied to data expansion memory 89 where the (3×3) redundant bits are removed and data bits are expanded in time dimension in response to a timing pulse supplied from timing pulse generator 87. Timing pulse generator 87 responds to the hunting pulse from word synchronizer 84 to word-synchronously supplies a timing signal to syndrome generator 82.

While mention has been made of three streams of 3 bits each, the present invention is not limited to this example. Any bit stream format such as single bit stream or six bit streams could equally be as well applied to the present invention and any number of redundant bits can be used.

The foregoing description shows only preferred embodiments of the present invention. Various modifications are apparent to those skilled in the art wihtout departing from the scope of the present invention which is only limited by the appended claims. Therefore, the embodiments shown and described are only illustrative, not restrictive.

What is claimed is:

1. A digital communication system comprising:
   means for generating sync bits;
   means for deriving redundant bits from a data bit stream which comprises a sequence of a main-channel data signal and an auxiliary-channel data signal which are multiplexed at frame intervals, wherein said sync bits occur immediately preceding said auxiliary-channel data signal;
   means for providing modulo-addition of said sync bits to said redundant bits to produce a composite data bit stream;
   means for transmitting said composite data bit stream;
   means for receiving the transmitted data bit stream;
   syndrome generator means for deriving syndromes from the received data bit stream;
   word synchronizer means conneted to said syndrome generator means for detecting the sync bits contained in one of said syndromes and causing said syndrome generator means to establish word synchronism with said received bit stream; and
   error corrector means for correcting errors in the received bit stream in accordance with said syndromes.

2. A digital communication system as claimed in claim 1, wherein said word synchronizer means includes detecting means for detecting a prescribed set of binary states in the syndromes which indiacate that there is no error in said data bit stream and causing said syndrome generator means to generate the syndrome synchronously with data words in said data bit stream.

3. A digital communcation system as claimed in claim 2, wherein said syndrome generator means includes means for generating a syndrome in response to each data word in said data bit stream, and wherein said detecting means of the word synchronizer means comprisese:
   a coincidence gate means for detecting a coincidence of bits in said syndromes; and
   a counter means for counting the occurrences of said coincidence, the output of said counter means controlling said syndrome generator means.

4. A digital communication system as claimed in claim 3, further comprising a serial-to-parallel converter for converting the output of said syndrome generator means into parallel form and applying it to said coincidence gate means.

5. A digital communication system as claimed in claim 4, further comprising means for detecting a data bit in error from the output of said serial-to-parallel converter and generating an error correcting code and applying it to said error corrector means.

* * * * *

UNITED STATES PATENT AND TRADEMARK OFFICE
CERTIFICATE OF CORRECTION

PATENT NO. : 4,779,275

DATED : October 18, 1988

INVENTOR(S) : Makoto YOSHIMOTO

It is certified that error appears in the above-identified patent and that said Letters Patent is hereby corrected as shown below:

COLUMN 2, LINE 18    Delete "bitgs" and insert --bits--.

COLUMN 3, LINE 39    Delete "supplied" and insert --supplies--.

COLUMN 3, LINE 40    Delete "lists" and insert --bits--.

COLUMN 5, LINE 53    Delete "wihtout" and insert --without--.

COLUMN 6, LINE 19    Delete "conneted" and insert --connected--.

COLUMN 6, LINE 30    Delete "indiacate" and insert --indicate--.

COLUMN 6, LINES 38 AND 39    Delete "comprisese:" and insert --comprises: --.

Signed and Sealed this

Twenty-third Day of May, 1989

Attest:

DONALD J. QUIGG

Attesting Officer

Commissioner of Patents and Trademarks